United States Patent
Numamoto et al.

(10) Patent No.: US 9,063,828 B2
(45) Date of Patent: Jun. 23, 2015

(54) CONTROLLER AND TRANSFER SPEED CONTROL METHOD

(75) Inventors: Masaya Numamoto, Kanagawa (JP); Makoto Satoh, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 286 days.

(21) Appl. No.: 13/536,440

(22) Filed: Jun. 28, 2012

(65) Prior Publication Data

US 2013/0013842 A1    Jan. 10, 2013

(30) Foreign Application Priority Data

Jul. 6, 2011    (JP) .................................. 2011-149725

(51) Int. Cl.
  *G06F 13/00* (2006.01)
  *G06F 13/40* (2006.01)
(52) U.S. Cl.
  CPC ............ *G06F 13/00* (2013.01); *G06F 13/4022* (2013.01); *Y02B 60/1228* (2013.01); *Y02B 60/1235* (2013.01)
(58) Field of Classification Search
  CPC .. G06F 13/00; G06F 13/4022; G06F 13/4027
  USPC .................................................. 710/315, 316
  See application file for complete search history.

(56) References Cited

U.S. PATENT DOCUMENTS

| 5,367,522 A * | 11/1994 | Otani ............................ 370/468 |
| 2005/0149640 A1* | 7/2005 | Hosokawa ......................... 710/8 |
| 2009/0006709 A1* | 1/2009 | Zhao et al. ..................... 710/315 |
| 2012/0185636 A1* | 7/2012 | Leon et al. ..................... 711/102 |
| 2012/0290757 A1* | 11/2012 | Cheng et al. .................. 710/301 |

FOREIGN PATENT DOCUMENTS

| JP | 2004-152156 A | 5/2004 |
| JP | 2005-71273 A | 3/2005 |
| JP | 2005-327247 A | 11/2005 |
| JP | 2006-330831 A | 12/2006 |

* cited by examiner

*Primary Examiner* — Nimesh G Patel
(74) *Attorney, Agent, or Firm* — Foley & Lardner LLP

(57) ABSTRACT

A USB 3 host controller according to the present invention includes a transfer speed switching unit besides a transfer data converting unit that mutually converts transfer data from a USB device and transfer data from a PCI Express bus. The transfer speed switching unit receives transfer information regarding data transfer from the USB device via a USB 3 interface when the USB device is connected, and identifies a transfer speed used by a PC side according to the transfer information or a result of analyzing the transfer information. Then, when a current transfer speed of the PC side is different from the identified transfer speed, the transfer speed switching unit transmits a speed switching signal indicating switch to the identified transfer speed to a PCI master via a PCI express interface.

20 Claims, 8 Drawing Sheets

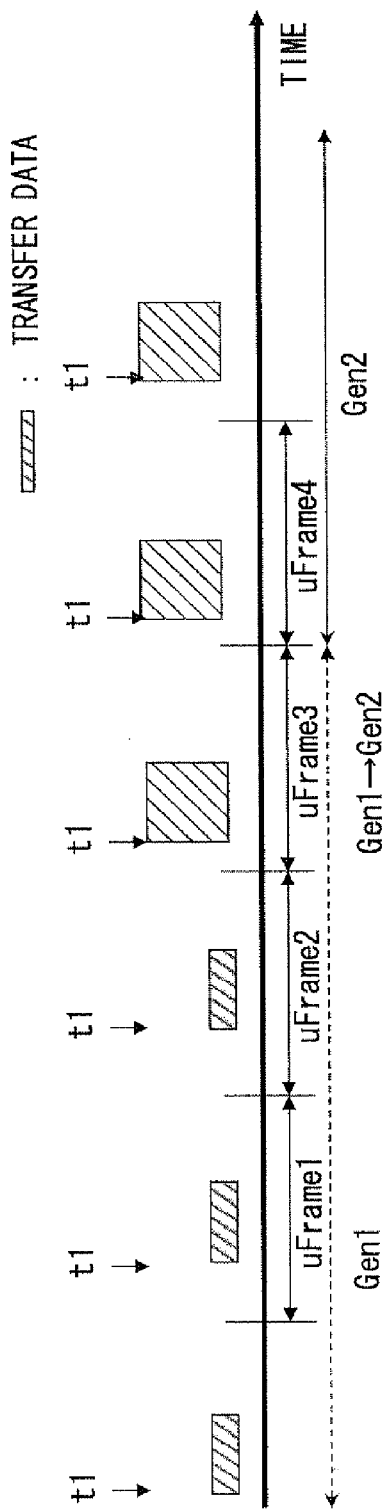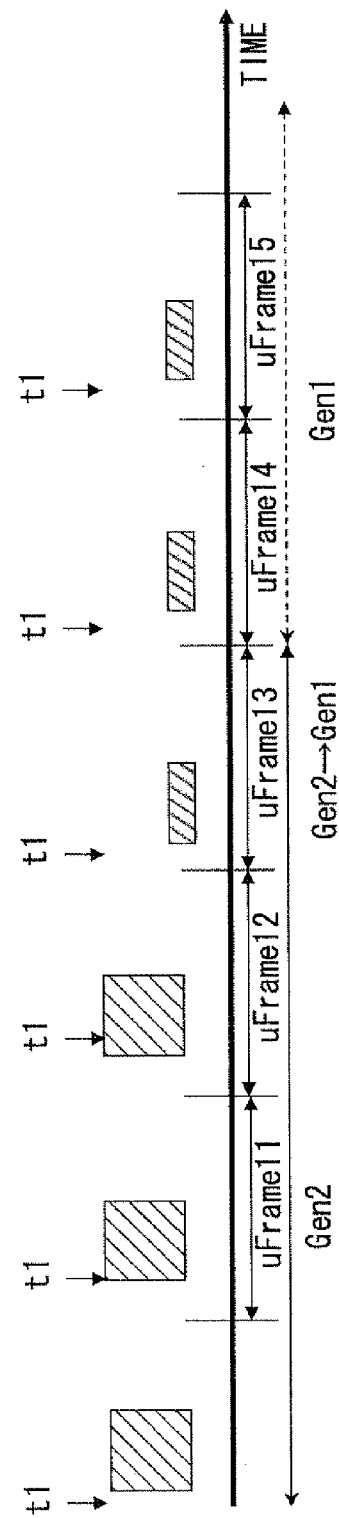
Fig. 4A
Fig. 4B

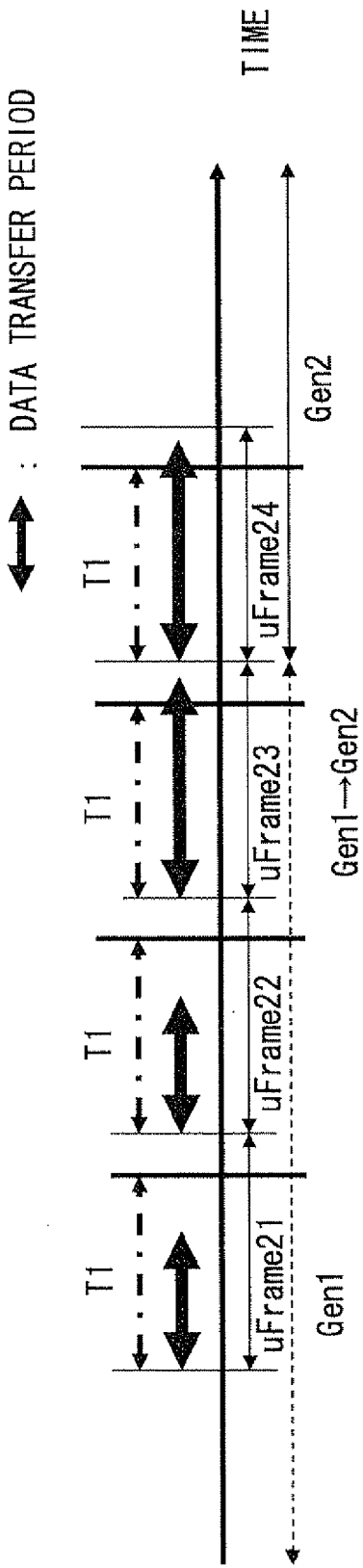
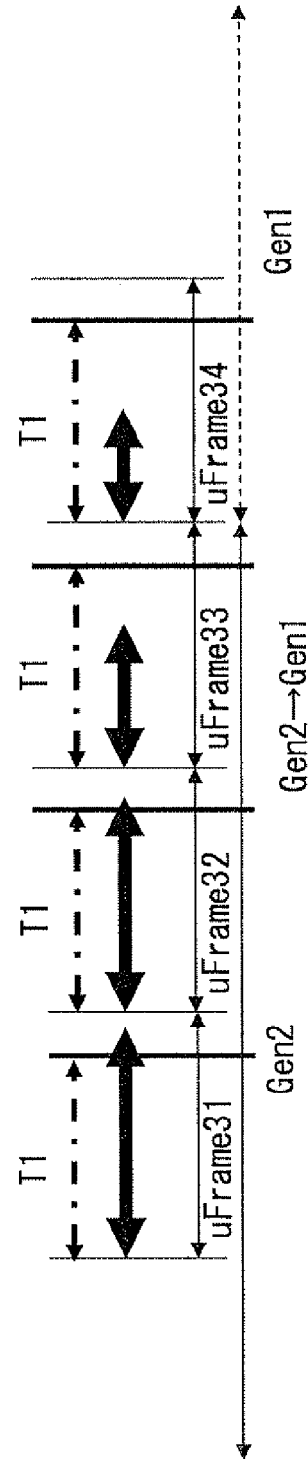
Fig. 5A
Fig. 5B

CONTROLLER AND TRANSFER SPEED CONTROL METHOD

CROSS-REFERENCE TO RELATED APPLICATIONS

This application is based upon and claims the benefit of priority from Japanese patent application No. 2011-149725, filed on Jul. 6, 2011, the disclosure of which is incorporated herein in its entirety by reference.

BACKGROUND

The present invention relates to a controller and a transfer speed control method that enable data transfer between buses with different standards such as PCI Express and USB, and particularly to a controller and a transfer speed thereof that are suitable for the case in which both standards have a plurality of transfer speeds.

USB (Universal Serial Bus) is in widespread use as an interface of external peripheral devices such as PC (Personal Computer), and various USB devices with USB interfaces have been created.

In the USB 2.0 standard, the maximum transfer speed can be increased up to 480 Mbps (High Speed), which has been 12 Mbps (Full Speed) in the USB 1.1 standard.

Japanese Unexamined Patent Application Publication No. 2005-327247 discloses that although the USB device adopting the USB 2.0 standard can increase the transfer speed extremely high, the higher the transfer speed to be close to the maximum transfer speed 480 Mbps, the larger the power consumption. For example, there is a problem pointed out that when the USB device adopting the USB 2.0 standard is connected to a mobile terminal device and the like, the limited power supply ability of the mobile terminal device is consumed in a short time.

Further, Japanese Unexamined Patent Application Publication No. 2005-071273 discloses an electronic device and an interface control method thereof that aim to obtain a connection mode at the time of connecting the USB cable, select a first or a second configuration according to the obtained connection mode, and execute a data transfer process according to the first or the second configuration.

By the way, when a device such as PC adopting the bus standard PCI express is connected to the USB device, a converter (hereinafter referred to as a USB host controller) for converting both data is required. Usually PCs often have these USB controllers mounted in advance, and a user can transfer data from the USB device to the PC only by inserting a USB device terminal to a USB terminal provided to the PC.

FIG. 8 is a view showing a USB host controller of a related art. As shown in FIG. 8, a USB 3 host controller 101 is connected to a PCI master 102, for example, inside the PC. The other side is connected to a USB device 103. This USB 3 host controller 101 includes a PCI Express interface 111, a transfer data converting unit 112, a USB 3 interface 113, and a USB 2 interface 114.

Data of the PCI Express standard is input to the transfer data converting unit 112 via the PCI Express interface 111 from the PCI master 102 side, and converted into USB 3 or USB 2 format data here. Then, data of the USB 3 format is output via the USB 3 interface and data of the USB 2 format is output via the USB interface 114 to the USB device 103, and vise versa. Specifically, data of the USB format is input to the transfer data converting unit 112 from the USB device 103 via the USB 3 interface 113 or the USB 2 interface 114, converted into data of the PCI Express format, and output to the PCI master 102 via the PCI interface 111.

Currently two transfer speeds, which are Gen1 (2.5 GT/s (Transaction Per Second: Tps)) and Gen2 (5 GT/s), are defined in the PCI Express. Note that 6.4 GTps=25.6 GBps.

On the other hand, there are four kinds of the transfer speeds supported by USB 3, which includes Super Speed (SS) (5 Gbps), besides the abovementioned High Speed (480 Mbps), Full Speed (12 Mbps), and Low Speed (1.2 Mbps). The only transfer speed that requires Gen2 (5 GT/s) is SS, and Gen1 (2.5 GT/s) is enough for the other transfer speeds.

SUMMARY

While the link speed is operating at Gen1, when the SS transfer (5 GT/s) is used in USB 3.0, there is not enough bus bands, and the link speed must be set to Gen2 at the time of SS transfer. Therefore, in an apparatus to connect USB devices such as a personal computer, the link speed is usually set to Gen2 at the beginning in devices that are possibly connected to a device capable of the SS transfer (the device hereinafter referred to as a SS device).

Accordingly, a USB host controller of the related art does not dynamically change the link speed of the PCI Express according to the connection kind of the USB device. That is, the USB host controller continues to operate at the link speed of the PCI Express once determined (except when the speed is reduced due to a communication error and the like).

However, when the link speed is Gen2, there is a problem that the power consumption is larger than the case of Gen1. Lower power consumption is desired especially for the devices that operate with batteries.

An aspect of the present invention is a controller connected between a first device that adopts a bus standard A specifying a plurality of transfer speeds for data transfer and a second device that adopts a bus standard B. The controller includes a first interface that is connected to the first device and transmits and receives data to and from the first device, a second interface that is connected to the second device and transmits and receives data to and from the second device, a transfer data converting unit that converts data of the bus standard A and data of the bus standard B between the first interface and the second interface, and a transfer speed switching unit that receives transfer speed information regarding data transfer from the first device via the first interface when the first device is connected, evaluates a transfer speed used by the second device according to the transfer information or a result of analyzing the transfer information, and when a current transfer speed input from the second device is different from the evaluated transfer speed, transmits a speed switching signal indicating switch to the evaluated transfer speed to the second device via the second interface.

In the present invention, the transfer speed necessary for the second device is identified according to the transfer information or the analysis result thereof that is obtained from the first device by the transfer speed switching unit. When the identified transfer speed is different from the currently set transfer speed, the transfer speed is switched to the identified transfer speed. Therefore, in the second device, as the transfer speed is switched to the transfer speed necessary for the data transfer with the first device, the power consumption can be reduced more than the case of, for example, setting the transfer speed to the maximum speed so as to enable transfer when the first device with any ability is connected.

Another aspect of the present invention is a transfer speed control method for a controller connected between a first device that adopts a bus standard A specifying a plurality of transfer speeds for transferring data and a second device that adopts a bus standard B. The transfer speed control method includes steps of
(a) transmitting and receiving data to and from a transfer data converting unit via a first interface by the first device,
(b) transmitting and receiving data to and from the transfer data converting unit via a second interface by the second device,
(c) mutually converting data of the bus standard A and data of the bus standard B by the transfer data converting unit, and
(d) switching a data transfer speed of the second device. The (d) step of switching the data transfer speed includes steps of
(d-1) receiving transfer information regarding data transfer from the first device via the first interface when the first device is connected,
(d-2) evaluating a transfer speed of the second device according to the transfer information or a result of analyzing the transfer information, and
(d-3) transmitting the speed switching signal indicating switch to the evaluated transfer speed to the second device via the second interface when a current transfer speed input from the second device is different from the evaluated transfer speed.

In the present invention, as the transfer speed of the second device is switched according to the transfer information and the analysis result thereof obtained from the first device, that is, the transfer speed is switched as necessary, the transfer speed can be set to the minimum speed in the second device by default, and thereby reducing the power consumption in the second device.

The present invention can provide a controller and a transfer speed control method that can reduce the power consumption in the second device.

BRIEF DESCRIPTION OF THE DRAWINGS

The above and other aspects, advantages and features will be more apparent from the following description of certain embodiments taken in conjunction with the accompanying drawings, in which:

FIGS. 4A and 4B are pattern diagrams showing timings that perform link speed change (recovery) and explain timings to perform the recovery according to a usage band;

FIGS. 5A and 5B are pattern diagrams showing timings that perform the link speed change (recovery) and explains timings to perform the recovery according to usage time;

DETAILED DESCRIPTION

Hereinafter, specific embodiments incorporating the present invention are explained in detail with reference to the drawings. This embodiment is about a data converting apparatus (hereinafter referred to as a host controller), which performs data transfer between different bus standards, for example the PCI Express standard and the USB standard, that incorporates the present invention.

The present inventors have found out that in a PC and the like mounted with a USB host controller supporting the SS transfer (Super Speed transfer of USB 3), the power can be saved more by efficiently switching the link speed (hereinafter the transfer speed of the second device or the PC side may be referred to as the link speed).

There are four kinds of the transfer speed supported by USB 3 is SS (5 Gbps), HS (480 Mbps), FS (12 Mbps), and LS (1.2 Mbps), as mentioned above. On the other hand, in the PCI Express, there are three kinds, which are Gen1 (2.5 GT/s), Gen2 (5 GT/s), and Gen3 (8 GT/s). Only SS requires Gen2 (5 GT/s) among the transfer speeds of the USB 3, and the transfer can be sufficiently performed with Gen1 in other transfer speeds. Hereinafter in this specification, the device capable of data transfer at the transfer speed SS (5 Gbps) among the USB devices may be referred to as an SS device.

In the current condition, usually configuration is made in advance to the PCI Express bus side so as to transfer data at the transfer speed of Gen2 in the product (such as an PC) that is possibly connected to the SS device. On the other hand, the transfer speed is usually set to Gen1, and the transfer speed is switched when the transfer speed of Gen2 and Gen3 is required, thereby reducing the power consumption. In the current condition, the transfer speed at the time when the SS device is connected can be changed to Gen2.

The present inventors focus that there are four transfer types indicating different data transfer systems according to the kind of transfer data and a transfer method, and found out a USB host controller and a transfer speed control method thereof that attempt to further save the power by taking into consideration the data transfer type and switching Gen1 and Gen2.

First Embodiment

Figure 1:
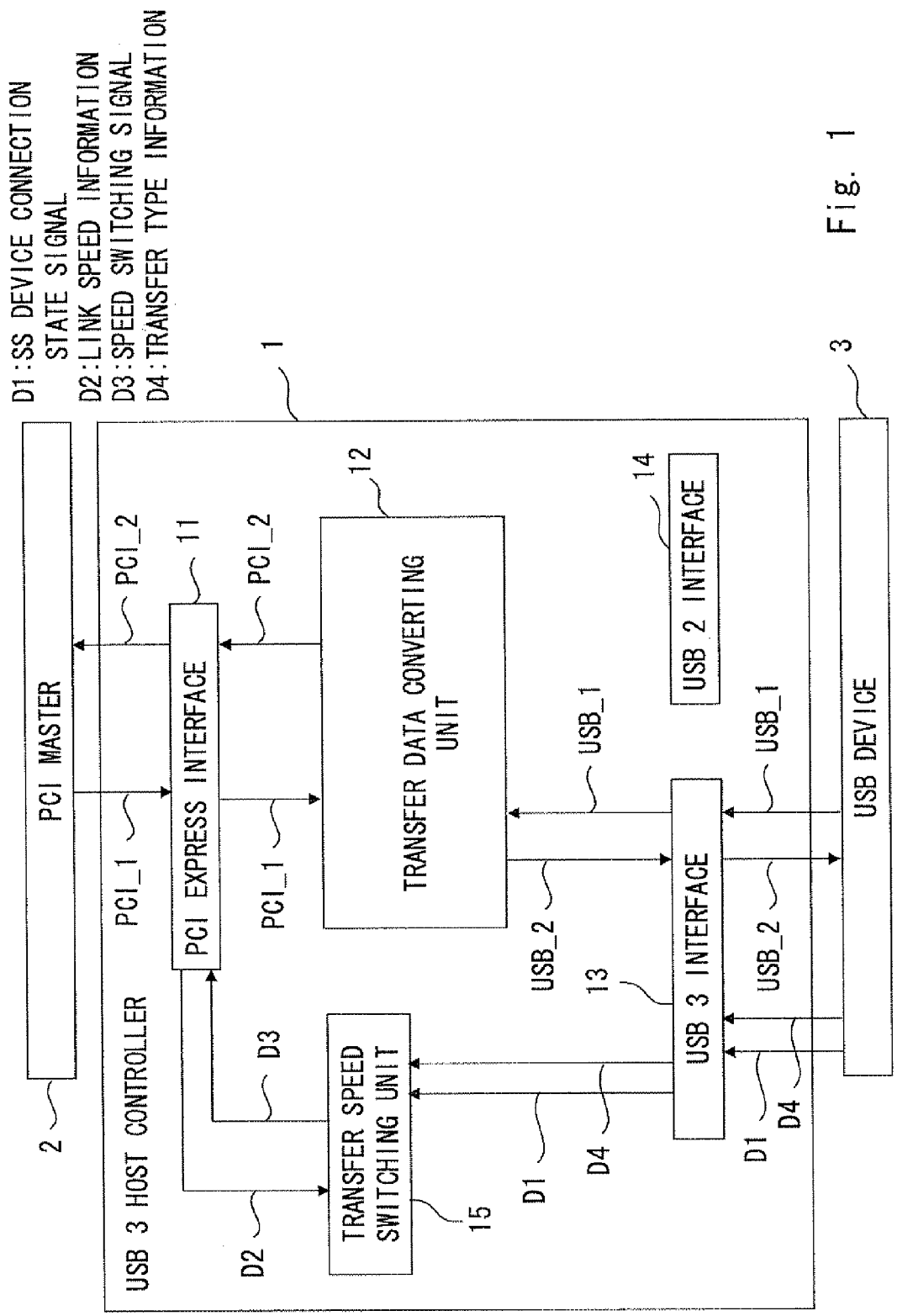
FIG. 1 is a view showing a USB host controller according to a first embodiment of the present invention.

FIG. 1 is a view showing a USB host controller according to a first embodiment of the present invention. A USB 3 host controller 1 is connected between a first device adopting the USB bus and a second device adopting a PCI Express bus. In this embodiment, the first device is a USB device. Further, a PC mounted with the USB 3 host controller 1 can be the second device. The USB 3 host controller is connected to the PCI master 2 in the PC. A USB device 3 such as a USB memory, a digital camera, and an audio device, is connected to the other side, and the data thereof is retrieved by the PC side via the USB 3 controller 1 or the data from the PC side is retrieved by the USB device via the USB 3 host controller 1.

The USB 3 host controller 1 includes a transfer speed switching unit 15 in addition to a PCI Express interface 11, a transfer data converting unit 12, a USB 3 interface 13, and a USB 2 interface 14. The PCI Express interface 11 is connected to the PCI master 2, and transmits and receives data to and from the PCI master 2. The USB 3 interface 13 and the USB interface 14 are respectively connected to the USB device 3 supporting the USB 3.0, 3.1, and the like and the USB device 3 supporting the USB 2.0, 2.1, 2.2, and the like, and transmits and receives data to and from the USB device 3. Note that in the USB 3 host controller 1, the connector parts of the USB 3 and USB 2 are separated. When the USB 3 device is connected, a connection signal is notified to the USB 3 interface, and when the USB 2 device is connected, a connection signal is notified to the USB 2 interface.

The transfer data converting unit 12 is disposed between the PCI Express interface 11, the USB 3 interface 13, and the USB 2 interface 14, and converts data of both standards. Specifically, data PCI_1 of the PCI Express standard is input to the transfer data converting unit 12 via the PCI Express interface 11 from the PCI master 2 side, and converted into the USB 3 or USB 2 format data. Then, data USB_2 of the USB 3 format is output via the USB 3 interface 13 and data USB_2 of the USB 2 format is output via the USB 2 interface 14 to the USB device 3, and vise versa. Specifically, data USB_1 of the USB format is input to the transfer data converting unit 12 from the USB device 3 via the USB 3 interface 13 or the USB 2 interface 14, converted into data PCI_2 of the PCI Express format, and output to the PCI master 2 via the PCI interface 11.

Then, the transfer speed switching unit 15 switches the transfer speed used by the PCI master 2 (PC) side. First, the transfer speed switching unit 15 receives transfer information D1 and D4 related to the data transfer from the USB device 3, which is input via the USB 3 interface 13 when the USB device 3 is connected. Then, the transfer speed switching unit 15 evaluates the transfer speed used by the PCI master 2 (PC) side according to this transfer information or an analysis result of the transfer information. Link speed information D2 indicating the current transfer speed is input to the transfer speed switching unit 15 from the PCI master 2. When the transfer speed indicated by the transfer speed information D2 is different from the evaluated transfer speed, for example when the current transfer speed setting is Gen1 and the evaluated transfer speed is Gen2, the transfer speed switching unit 15 transmits a speed switching signal D3 that indicates switch to the evaluated transfer speed Gen2 to the PCI master 2 via the PCI Express interface 11.

In this embodiment, the transfer information here includes the information D1 indicating whether the currently connected USB device 3 corresponds to any of the transfer speeds, and the information D4 indicating the transfer type. The information indicating that the currently connected USB device 3 corresponds to any of the transfer speeds is specifically an SS device connection state signal D1 indicating, for example, whether or not the connected USB device 3 is the SS device. Further, there are four transfer types in the USB device 3, which are Control transfer as a first transfer type to transfer control data, Interrupt transfer as a second transfer type to transfer when data transfer is necessary, Bulk transfer as a third transfer type to transfer a large amount of data, and Isochronous transfer as a fourth transfer type to transfer data real-time. The transfer type information D4 indicates one of the transfer types of the data to be transferred.

In this embodiment, in the case in which the SS device is connected as the USB device 3 and the transfer type is the Bulk transfer, when the PC side is set to Gen1, switching to Gen2 reduces the power consumption. The power can be saved also by setting the transfer speed of the PC side to Gen1 in a normal state and switching the transfer speed to Gen2 only when the SS device is connected.

On the other hand, the present inventors have found out that Gen1 is enough for the time not performing the data transfer even when the SS device is connected and the case of not transferring a large amount of data, thus the power can be further saved by controlling the link speed to switch the transfer speed to Gen2 when the SS device is connected and also Bulk transfer is performed.

Link speed change supported by the PCI Express is performed to switch the transfer speed from Gen1 to Gen2.

Figure 2:
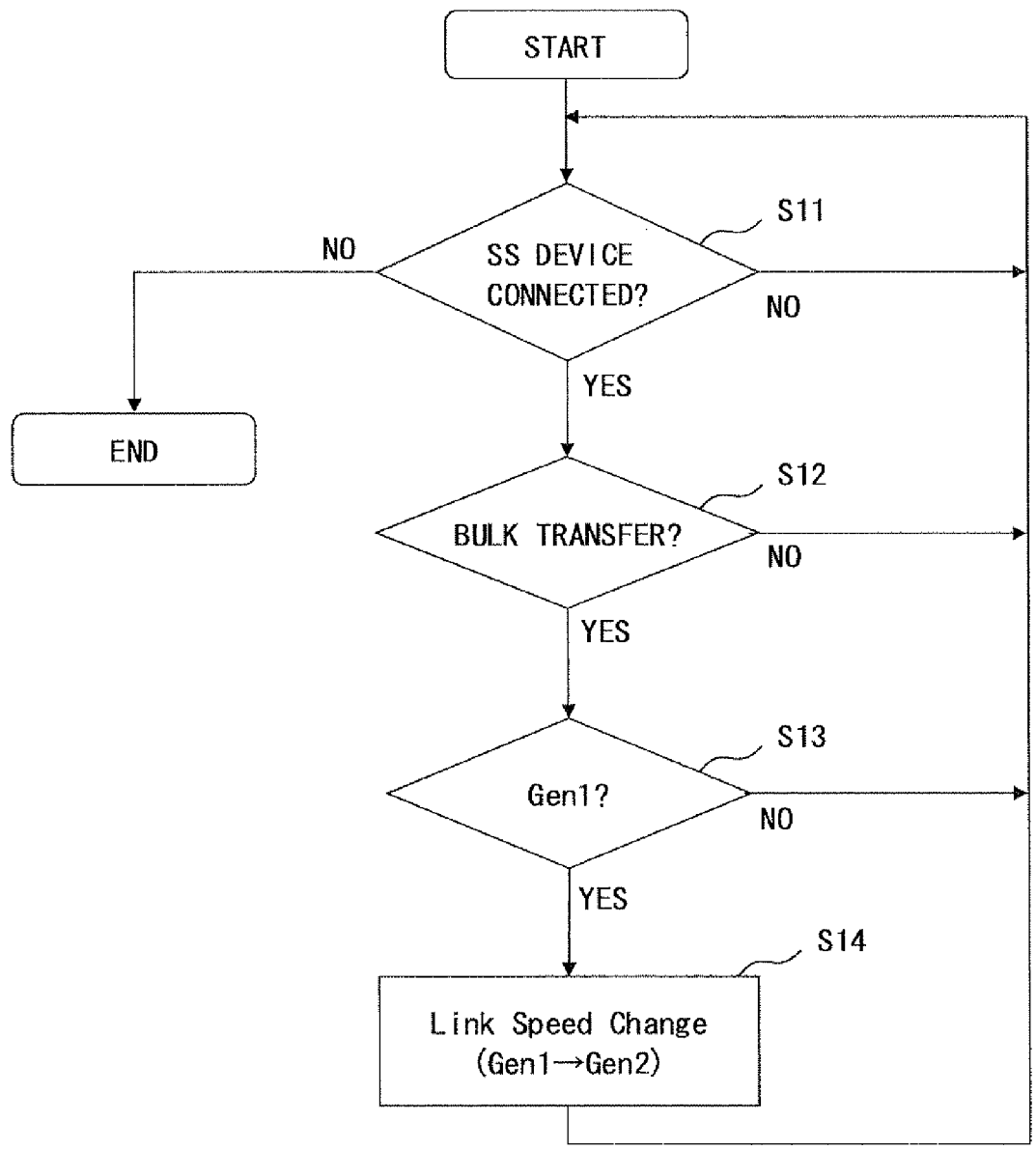
FIG. 2 is a flowchart showing a transfer speed control method according to the first embodiment of the present invention.

FIG. 2 is a flowchart showing a transfer speed control method according to this embodiment. As shown in FIG. 2, when the SS device is connected, the SS device connection state signal D1 indicating the connection of the USB device 3 is output from the USB device 3 to the USB interface 13. An input of the SS device connection state signal D1 also to the transfer speed switching unit 15 enables the transfer speed switching unit 15 to detect that the SS device is connected (step S11).

Next, when the data is transferred from the SS device, the transfer type information D4 is input to the transfer speed switching unit 15 via the USB 3 interface 13. At this time, in the case of the Interrupt transfer and the Control transfer (step S12: No), the transfer speed is not switched to Gen2. Only when the transfer type is the Bulk transfer (step S13: Yes) and also the transfer speed of the PC side is set to Gen1 by the link speed information D2 (step S13: Yes), the transfer speed switching unit 15 outputs the speed switching signal D3 to the PCI Express interface 11 (step S14). Then, the link speed change is performed and the transfer speed of the PC side is switched to Gen2.

While the link speed by the PC side is usually set to Gen2, in this embodiment, the default transfer speed can be set to Gen1, which is the minimum transfer speed. This is to detect the time that surely requires the transfer speed of Gen2 and switch the link speed from Gen1 to Gen2 according to the detection result. As the timing that surely requires the high transfer speed is detected to switch the transfer speed, the link speed can be set to the minimum transfer speed Gen1 by default. Then, further power saving can be achieved as compared to the case of switching the transfer speed depending on whether the SS device is connected or not.

Note that although this embodiment explained that the transfer speed is switched to Gen2 only in the case of the Bulk transfer, the link speed of the PC side may be switched according to the information indicating the kind of the USB device 3 and the information indicating the maximum transfer speed permitted by the USB device 3 in addition to the information of whether or not the transfer is the Bulk transfer or in place of the information indicating the transfer type.

The kind of the USB device 3 is for example whether the USB device 3 is a USB memory, a digital camera, a digital video camera, or a printer. It is possible to evaluate whether or not Gen3 or Gen2 is required as the link speed according to the kind of the USB device 3. For example, when a digital video camera is connected as the USB device 3, it is evaluated that a large amount of the data transfer is required and the link speed is switched to Gen2 or Gen3. When the maximum transfer speed supported by the USB device 3 requires Gen2 or Gen3, the link speed can be switched.

At the time of connection process with the USB device 3, the USB 2 interface 14 can obtain the information indicating whether the device corresponds to one of the transfer speeds such as whether the currently connected USB device 3 is the SS device, the information indicating the kind of the USB device 3, and the information indicating the maximum transfer speed permitted by the USB device 3.

When the transfer is the Isochronous transfer and the amount of transfer data is large, the link speed may need to be changed to Gen2. Next, a method is explained that analyzes the transfer information from the USB device 3 in more detail, evaluates whether one of the link speeds is required more specifically than the first embodiment, and performs switching.

Second Embodiment

Figure 3:
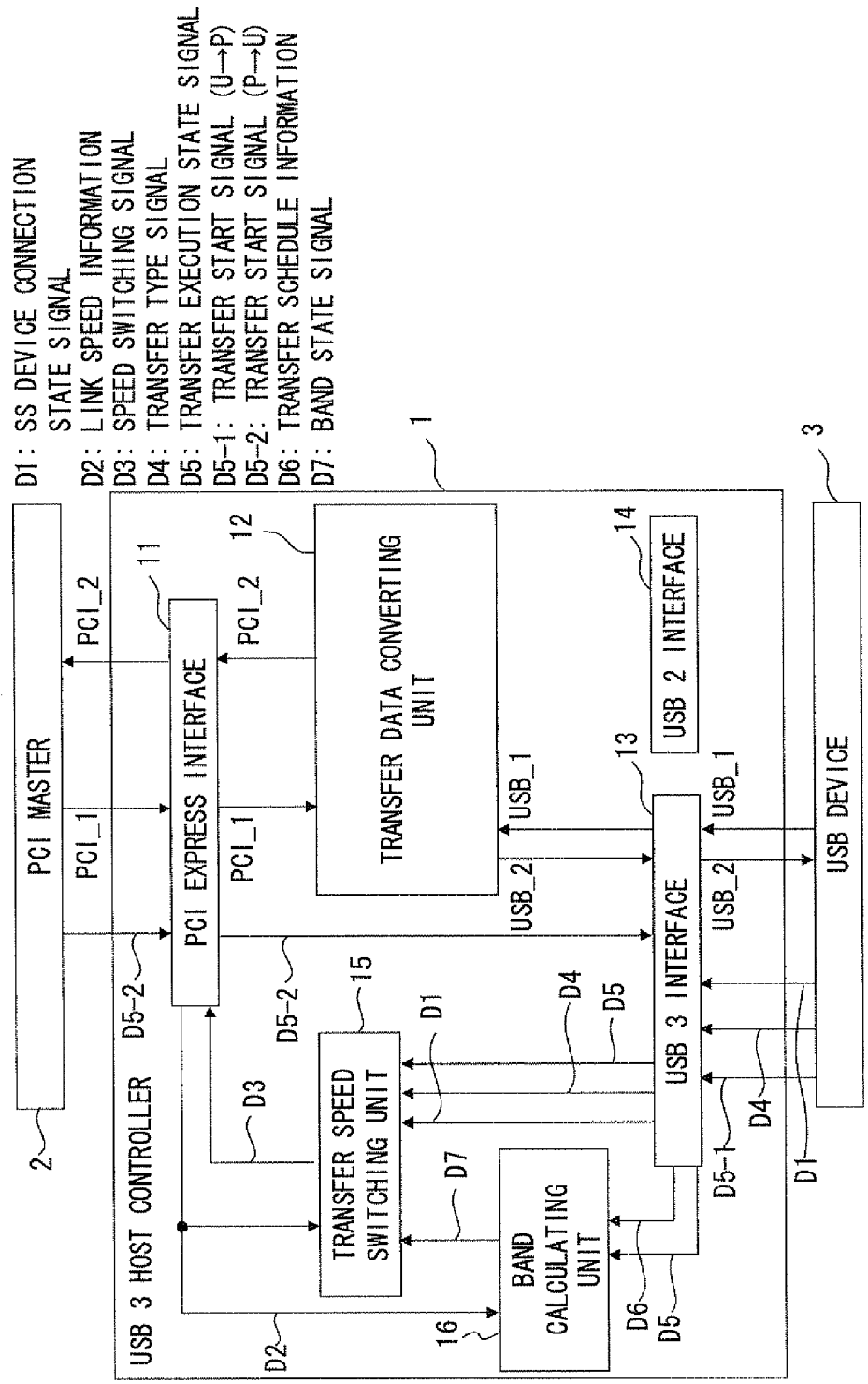
FIG. 3 is a view showing a USB 3 host controller 1 according to a second embodiment of the present invention.

FIG. 3 is a view showing a USB 3 host controller 1 according to a second embodiment of the present invention. The USB 3 host controller 1 according to this embodiment further includes a band calculating unit 16 in addition to the configuration of the USB 3 host controller 1 according to the first embodiment. The band calculating unit 16 obtains the transfer information including a transfer execution state signal D5 indicating whether or not the data is currently being transferred from the USB device 3 via the USB 3 interface 13, and outputs a band state signal D7 indicating a result of evaluating whether or not the transfer speed is appropriate according to the transfer information to the transfer speed switching unit 15.

In response to the band state signal D7, the transfer speed switching unit 15 transmits the speed switching signal D3 to the PCI master 2 via the PCI Express interface 11 according to the transfer speed or the result of analyzing the transfer information, the current transfer speed input from the PCI master 2, and the band state signal D7.

Specifically, as the transfer information, the band calculating unit 16 obtains the transfer type such as the Isochronous transfer and the Bulk transfer, transfer schedule information D6 regarding the size of transfer data and the period of data transfer, the transfer execution state signal D5 and the like from the USB device 3 via the USB interface 13. In this embodiment, the transfer schedule information D6 indicates the size to be transferred and the number of end points to perform the Isochronous transfer. The band calculating unit 16 evaluates whether or not Gen1 is enough for the transfer that is currently being performed according to the transfer schedule information D6 and the transfer execution state signal D5, and outputs the evaluation result to the transfer speed switching unit 15 as the band state signal D7. Further, the link speed information D2 is input from the PCI master 2 via the PCI Express interface 11. This link speed information D2 is used when performing band calculation by the band calculating unit 16, which is described later.

The SS device connection state signal D1, the transfer type information D4, and the transfer schedule information D6 is obtained when the USB device 3 is connected to the USB 3 host controller 1 and the connection process is performed. Moreover, a transfer start signal D5-1 is output from the USB device 3 at a timing when the data transfer is started. Similarly, a transfer start signal D5-2 is output from the PC side to the USB device 3 at the timing when the data transfer is started. In addition, the link speed information D2 and the band state signal D7 are always notified, and as described above, the speed switching signal D3 is output at a timing when there is a need to change the link speed of the PC side, such as from Gen2 to Gen2 and from Gen2 to Gen3.

It has been explained that the band calculating unit 16 evaluates whether or not the transfer speed Gen1 is enough for the currently needed data transfer speed according to the transfer information and the transfer execution state signal D5, and generates the band state signal as the evaluation result. By the way, this embodiment attempts to save power by setting the transfer speed of the PC side in a normal time to Gen1, which is the minimum speed, detecting the timing that requires the faster transfer speed than Gen1, and switching the transfer speed of the PC side to Gen2 or Gen3.

As a method for detecting the timing to switch the transfer speed, the band calculating unit 16 may perform the band calculation and detect the timing when the transfer data reaches a certain band. When the timing is detected, the band calculating unit 16 generates the band state signal D7 indicating the change in the link speed to Gen2 or Gen3, and outputs the band state signal D7 to the transfer speed switching unit 15. Otherwise, the degree of band usage may be evaluated only from the transfer time actually taken for the transfer. When the transfer time reaches certain transfer time, in a similar way, the band calculating unit 16 generates the band state signal D7 indicating the change in the link speed to Gen2 or Gen3, and outputs the band state signal D7 to the transfer speed switching unit 15.

Next, a method for detecting the timing to switch the transfer speed according to the usage band or the transfer time of the transfer data is explained. FIGS. 4A, 4B, 5A and 5B are pattern diagrams indicating the timings to perform the link speed change (recovery) and explain the timings to perform the recovery respectively according to the usage band and the usage time.

As shown in FIGS. 4A and 4B, the USB device 3 inputs and outputs data for every uFrame, and schedule of the USB device 3 is managed for every uFrame. The band calculating unit 16 calculates the usage band at the timing t1 of each uFrame, for example. As shown in FIG. 4A, when the usage band is smaller than a predetermined value Vth at the timing t1 of uFrame1 and uFrame2, the link speed of the PC side is maintained to be Gen1. After that, when the usage band exceeds the predetermined value Vth at the timing t1 of uFrame, the band calculating unit 16 outputs the band state signal D7 indicating to perform the link speed change to the transfer speed switching unit 15, and the transfer speed switching unit 15 outputs the speed switching signal D3 to the PCI Express interface 11. Then, the link speed is changed from Gen1 to Gen2.

On the other hand, in the case in which the usage band is greater than the predetermined value Vth and the data is transferred at the link speed Gen2, as shown in FIG. 4B, when the usage band becomes smaller than the predetermined value Vth at the timing t1 of uFrame13, in a similar manner, the band calculating unit 16 outputs the band state signal D7 indicating to perform the link speed change to the transfer speed switching unit 15, and the transfer speed switching unit 15 outputs the speed switching signal D3 to the PCI Express interface 11. Then, the link speed is changed from Gen2 from Gen1.

Note that the timing t1 may be at the beginning, the end, or in the middle of uFrame, as shown in FIGS. 4A and 4B. Although this example explained that the usage band at the timing t1 is checked, t2 and the like may be provided besides t1 inside uFrame and when the usage band exceeds the predetermined value Vth at the continuous timings t1 and t2, the link speed change may be performed. This excludes the cases when the amount of transfer data temporarily increases or decreases.

A specific calculation example of the amount of usage band is explained. Note that this specific example explained the case of calculating an amount of usage band as usage band time. The transfer schedule information D6 includes Max Packet Size and the period to transfer data. Accordingly, the usage band time can be calculated by the following formula using the amount of data transferred in one uFrame.

The usage band time=$\{$(burst size$\times$one packet size)/transfer rate (Gen1 or Gen2)$\}\times$the number of end points The burst size here indicates the number of times capable of continuous transfer. In the Interrupt transfer (burst=3, packet size 1024 bytes (fixed)) with the number of end points is two and Gen1, the usage band time=$\{(3\times1024\times8)/(2.5\times1000\times1000\times1000)\}\times2=1.96608\times10^{-5}$ us (the reason for $\times8$ is to convert into bits)

The amount of transfer must be obtained in order to calculate the usage band. On the other hand, as described above, there is an easier method for detecting the timing of the link speed change from the time taken for the data transfer. As shown in FIG. 5A, since the transfer time is shorter than the period T1 of uFrame period in uFrame21 and 22, the link speed shall be Gen1. On the other hand, in uFrame23, as the transfer time exceeds the period T1, the band calculating unit 16 outputs the band state signal D7 indicating to perform the link speed change to the transfer speed switching unit 15, and the transfer speed switching unit 15 outputs the speed switching signal D3 to the PCI Express interface 11. Then, the link speed is changed from Gen1 to Gen2.

Similarly, while transferring data at Gen2, as the transfer time falls below the period T1 in uFrame33, the band calculating unit 16 outputs the band state signal D7 indicating to perform the link speed change to the transfer speed switching unit 15, and the transfer speed switching unit 15 outputs the speed switching signal D3 to the PCI Express interface 11. Then, the link speed is changed from Gen2 to Gen1.

Note that although the criterion in this example is whether or not the transfer time is within the period T1, repeated periods T1 for twice or more may be the timing. This excludes the cases in which the amount of transfer data temporarily changes.

Figure 6:
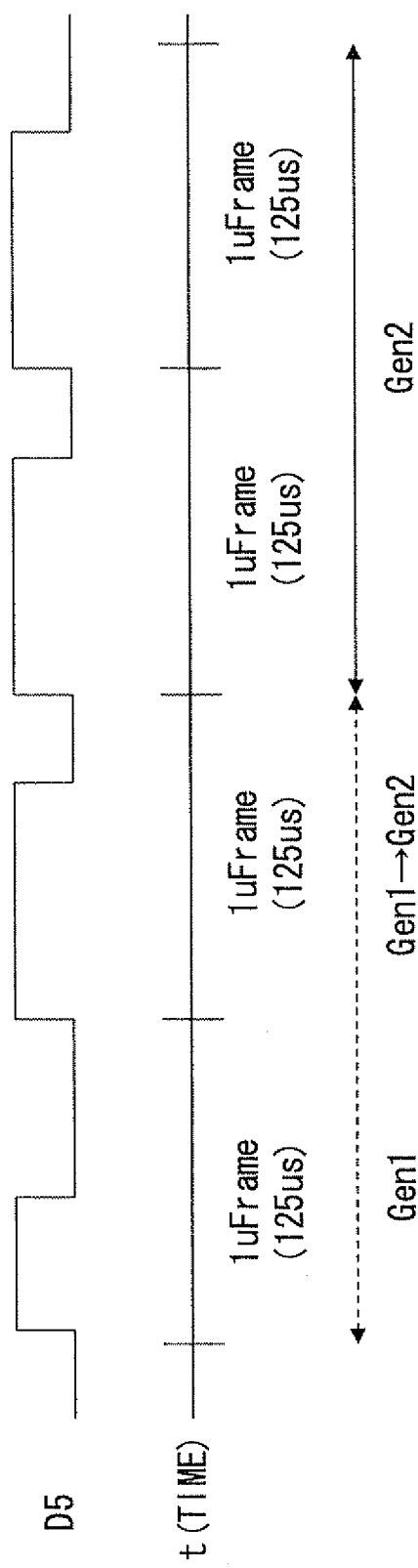
FIG. 6 is a view for explaining a switching process of the link speed according to the usage time of a bus.

A specific example of switching the link speeds Gen1 and Gen2 according to the bus usage time is explained. FIG. 6 is a view for explaining a process for switching the link speed according to the bus usage time. The transfer execution state signal D5 shall be a level signal here. Specifically, the transfer execution state signal D5 can be Hi level during transfer and Low level while not in transfer.

When the band calculating unit 16 includes time information of one uFrame, the transfer execution state signal D5 is Hi level all the time during transfer. Thus, the band calculating unit 16 can recognize how long the data has been transferred by the transfer execution state signal D5. When the transfer execution state signal D5 is Low level, the band calculating unit 16 can recognize that the transfer is not being performed. Accordingly as shown in FIG. 6, when it is detected that the period in which the transfer execution state signal D5 becomes Hi level is longer than or equal to a certain value in uFrame during transfer at the link speed Gen1, for example, the link speed can be increased from Gen1 to Gen2 by the link speed switching process.

Figure 7:
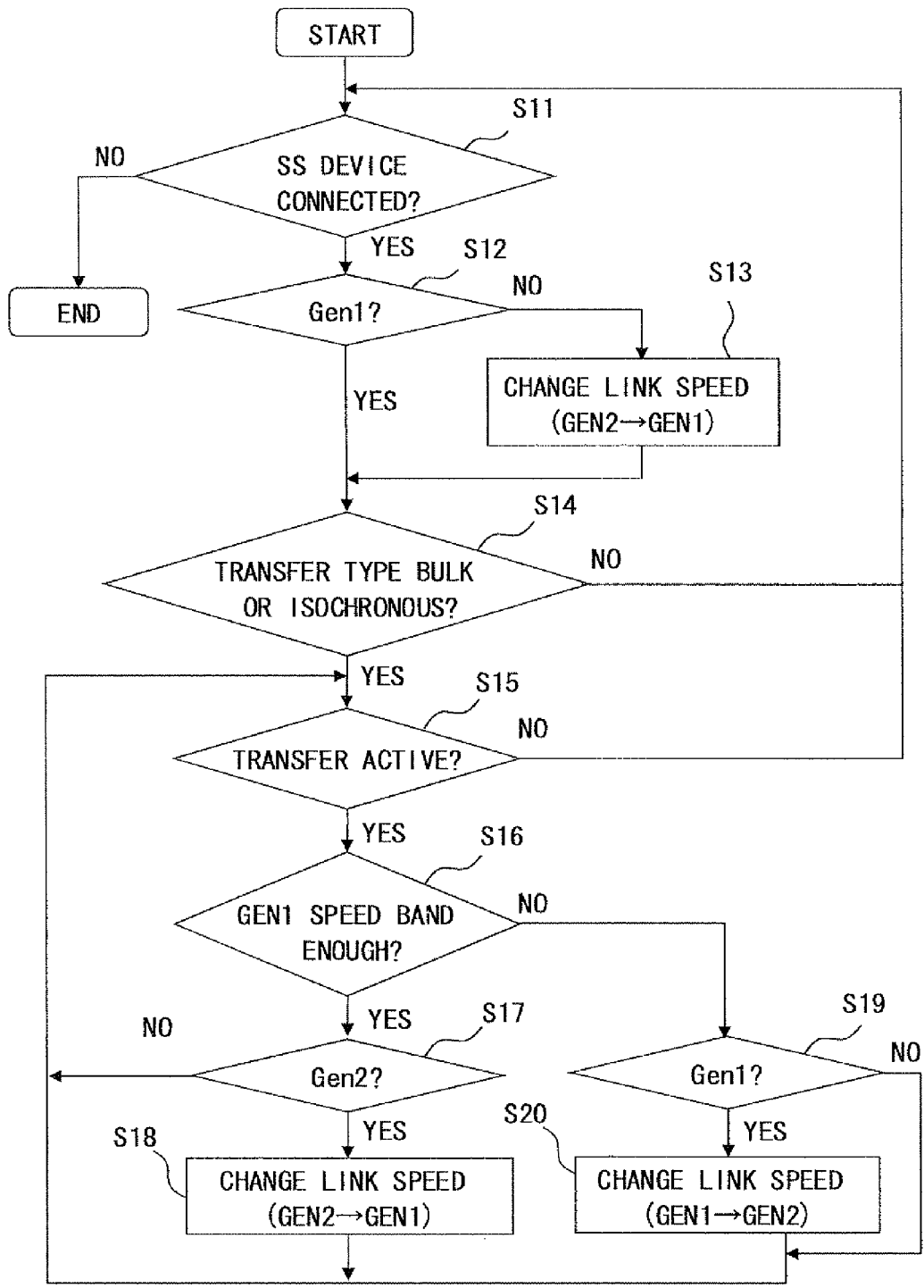
FIG. 7 is a flowchart showing a transfer speed control method according to a second embodiment of the present invention.
Figure 8:
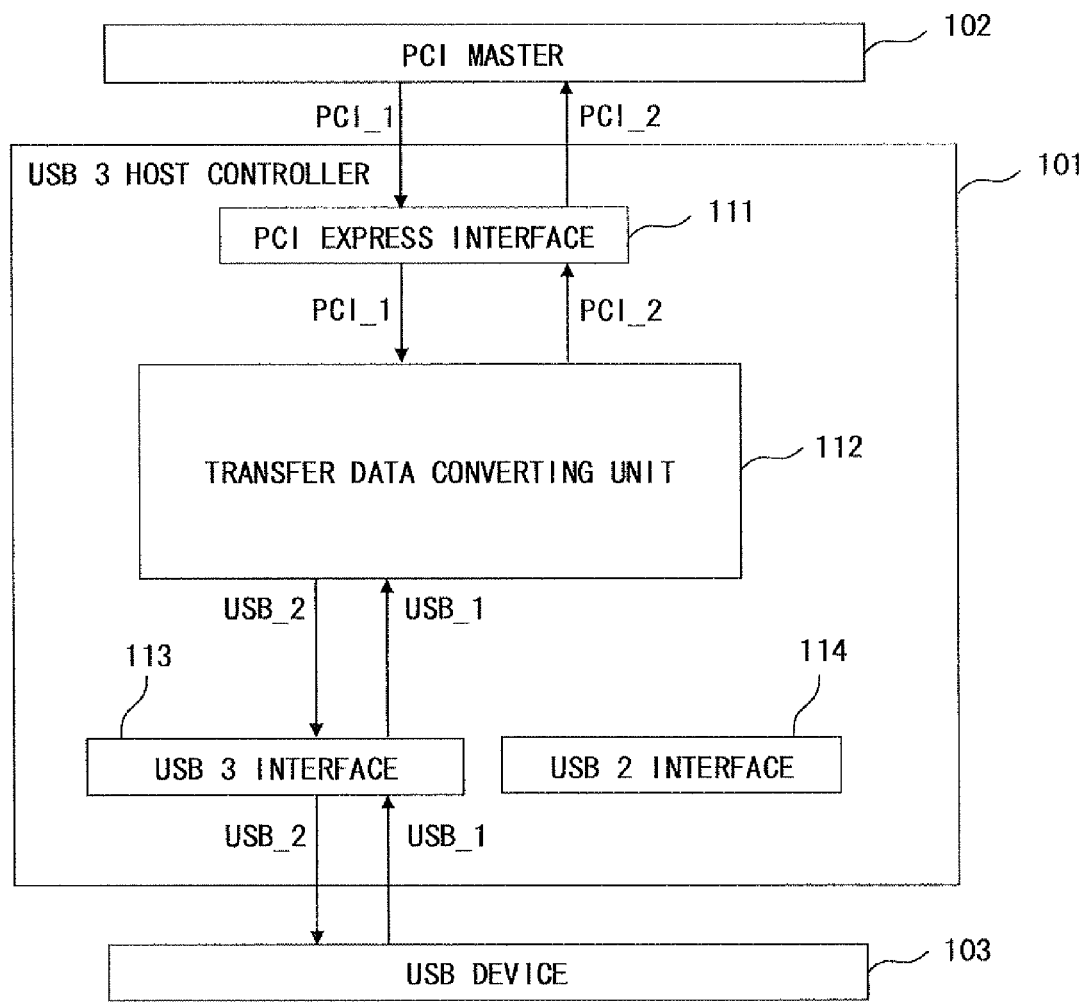
FIG. 8 is a view showing a USB host controller of a related art.

Next, the transfer speed control method according to this embodiment is explained. FIG. 7 is a flowchart showing the transfer speed control method according to this embodiment. As shown in FIG. 7, the transfer speed switching unit 15 evaluates whether or not the SS device is connected by the SS device connection state signal D1 (step S11). Next, the transfer speed switching unit 15 evaluates using the link speed information D2 whether or not the current link speed is the minimum transfer speed, which is Gen1 in this example (step S12). Note that when there are three or more transfer speeds such as V1, V2, and V3, the transfer speed may be V2 in a normal time.

Next, when the link speed is Gen1, the link speed is changed to Gen2 (step S13). Then, the transfer type is evaluated by the transfer type information D4 whether it is the Bulk transfer or the Isochronous transfer. When the transfer type is the Bulk transfer or the Isochronous transfer (step S14: Yes), the band calculating unit 16 further evaluates whether or not it is during transfer by the transfer execution state signal D5. Further, the band calculating unit 16 receives the transfer schedule information D6 and the like and evaluates whether or not Gen1 is enough for the transfer.

The band calculating unit 16 evaluates whether the link speed needs to be switched to Gen2, for example, as mentioned above, by evaluating whether the usage band in uFrame is a predetermined value Vth or greater and evaluating whether or not the transfer time in uFrame is predetermined time T1 or longer. In the case that is evaluated that the link speed needs to be changed to Gen2 (step S16: No), when the current link speed is Gen1 (step S19: Yes), the link speed change is performed (step S20). That is, the band calculating unit 16 outputs the band state signal D7 indicating to perform the link speed change to the transfer speed switching unit 15, and the transfer speed switching unit 15 outputs the speed switching signal D3 to the PCI Express interface 11 to change the link speed from Gen1 to Gen2.

On the other hand, in the case that is evaluated that the link speed Gen1 is enough for the current data transfer (step S16: Yes), when the current link speed is Gen2 (step S17: Yes), the link speed change is performed (step S18). That is, the band calculating unit 16 outputs the band state signal D7 indicating to perform the link speed change to the transfer speed switching unit 15, and the transfer speed switching unit 15 outputs the speed switching signal D3 to the PCI Express interface 11 to change the link speed from Gen2 to Gen1.

In this embodiment, the transfer information from the USB device 3 is analyzed, the link speed necessary for the current data transfer is evaluated according to the transfer band, the transfer band and the like, and the link speed change is performed at a timing evaluated that requires the change. Then, as the link speed of the PC side can be switched at an actually necessary timing, the power consumption can be further reduced more efficiently than in the first embodiment.

Note that the present invention is not limited to the above embodiments, but various modifications can be made without departing from the scope of the present invention.

For example, although the above embodiments have been explained as a hardware configuration, it is not limited to this, but it can be realized by causing CPU (Central Processing Unit) to execute a program to perform arbitrary processes. In this case, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A controller connected between a first device that adopts a bus standard A specifying a plurality of transfer speeds for data transfer and a second device that adopts a bus standard B, the controller comprising:
    a first interface that is connected to the first device and transmits and is configured to receive data to and from the first device;
    a second interface that is connected to the second device and is configured to transmit and receive data to and from the second device;
    a transfer data converting unit that is configured to convert data of the bus standard A and data of the bus standard B between the first interface and the second interface; and
    a transfer speed switching unit that is configured to receive transfer information regarding data transfer from the first device via the first interface when the first device is connected, to evaluate a target transfer speed to be used by the second device according to the transfer information or a result of analyzing the transfer information, and when a current transfer speed input from the second device is different from the target transfer speed, to transmit a speed switching signal to the second device via the second interface, the speed switching signal indicating switch to the target transfer speed, wherein the transfer information includes information indicating a data transfer type indicating a different data transfer system according to a kind of transfer data and a transfer method, and the transfer speed switching unit is configured to determine the target transfer speed to be used by the second device according to the data transfer type.

2. The controller according to claim 1, wherein the transfer information includes information indicating whether the currently connected first device corresponds to one of the plurality of transfer speeds.

3. The controller according to claim 1, wherein the transfer information includes information indicating a kind of the first device and/or information indicating a maximum transfer speed of the first device.

4. The controller according to claim 1, wherein the transfer speed switching unit is configured to obtain information indicating whether the currently connected first device corresponds to one of the transfer speeds, information indicating a kind of the first device, and information indicating a maximum transfer speed of the first device at a connection process with the first device.

5. The controller according to claim 1, further comprising a band calculating unit that is configured to obtain the transfer information including a transfer execution state signal from the first device via the first interface and to output a band state signal to the transfer speed switching unit, the transfer execution state signal indicating whether data is currently being transferred and the band state signal indicating a result of evaluating whether or not one of the transfer speeds is appropriate,
    wherein the transfer speed switching unit is configured to transmit the speed switching signal to the second device via the second interface according to the current transfer speed input from the second device and the band state signal.

6. The controller according to claim 5, wherein the band calculating unit is configured to obtain the transfer information that includes schedule information of transfer data including a data size to be transferred, the transfer type indicating a different data transfer system according to a kind of the transfer data or a transfer method, and the transfer information including the transfer execution state signal from the first device via the first interface, and is configured to generate the band state signal according to the obtained information.

7. The controller according to claim 6, wherein
    the bus standard A is configured to specify a transfer speed A1 as a speed for transferring data and a transfer speed A2 that is faster than the transfer speed A1, and
    the band calculating unit is configured to generate the band state signal that evaluates whether or not a currently necessary data transfer speed is the transfer speed A1 according to the transfer information and the transfer execution state signal, and outputs the band state signal to the transfer speed switching unit.

8. The controller according to claim 5, wherein the first interface is configured to receive a transfer start signal that notifies start of the data transfer from the first device, is configured to generate the transfer execution state signal according to the transfer start signal, and is configured to output the transfer execution state signal to the band calculating unit and the transfer speed switching unit.

9. The controller according to claim 1, wherein the bus standard A is a USB standard and the bus standard B is a PCI Express standard.

10. The controller according to claim 9, wherein the transfer speed A of the bus standard A is LowSpeed (1.2 Mbps), FullSpeed (12 Mbps), or HighSpeed (480 Mbps), and the transfer speed A2 is SuperSpeed (5 Gbps).

11. The controller according to claim 9, wherein the transfer speed B1 of the bus standard B is Generation1 (2.5 GTps) and the transfer speed B is Generation2 (5 GTps).

12. The controller according to claim 9, wherein the first to the fourth transfer type are respectively Control transfer, Interrupt transfer, Bulk transfer, and Isochronous transfer.

13. A controller connected between a first device that adopts a bus standard A specifying a plurality of transfer speeds for data transfer and a second device that adopts a bus standard B, the controller comprising:
    a first interface that is connected to the first device and transmits and is configured to receive data to and from the first device;
    a second interface that is connected to the second device and is configured to transmit and receive data to and from the second device;
    a transfer data converting unit that is configured to convert data of the bus standard A and data of the bus standard B between the first interface and the second interface; and
    a transfer speed switching unit that is configured to receive transfer information regarding data transfer from the first device via the first interface when the first device is connected, to evaluate a target transfer speed to be used by the second device according to the transfer information or a result of analyzing the transfer information, and when a current transfer speed input from the second device is different from the target transfer speed, to transmit a speed switching signal to the second device via the second interface, the speed switching signal indicating switch to the target transfer speed,
    wherein
    the bus standard A specifies a transfer speed A1 as a speed for transferring data and a transfer speed A2 that is faster than the transfer speed A1,
    the bus standard B specifies a transfer speed B1, as the speed for transferring data and a transfer speed B2 that is faster than the transfer speed B1 and corresponds to the transfer speed A2,
    the transfer information includes a transfer type indicating a different data transfer system according to a kind of transfer data and a transfer method, the transfer type specifies a first transfer type for transferring control data, a second transfer type for transferring data when the data transfer is necessary, a third transfer type for transferring a large amount of data, and a fourth transfer type for transferring data real-time, the second device is previously set to the transfer speed B1, and when the currently connected first device is capable of transferring data at the transfer speed A2 and transfers the data with the third transfer type, the transfer speed switching unit transmits the speed switching signal that indicates the switch to the transfer speed B2 to the second device via the second interface.

14. The controller according to claim 13, wherein when the currently connected first device is capable of transferring data at the transfer speed A2 and transfers the data with the fourth transfer type, the transfer speed switching unit transmits the speed switching signal that indicates the switch to the transfer speed B2 to the second device via the second interface.

15. A transfer speed control method for a controller connected between a first device that adopts a bus standard A specifying a plurality of transfer speeds for transferring data and a second device that adopts a bus standard B, the transfer speed control method comprising steps of:

transmitting and receiving data to and from a transfer data converting unit via a first interface by the first device;

transmitting and receiving data to and from the transfer data converting unit via a second interface by the second device;

mutually converting data of the bus standard A and data of the bus standard B by the transfer data converting unit; and switching a data transfer speed of the second device, wherein the step of switching the data transfer speed comprises steps of:

receiving transfer information regarding data transfer from the first device via the first interface when the first device is connected;

determining a target transfer speed to be used by the second device according to the transfer information or a result of analyzing the transfer information; and transmitting the speed switching signal to the second device via the second interface when a current transfer speed input from the second device is different from the target transfer speed, the speed switching signal indicating switch to the target transfer speed, wherein the transfer information includes information indicating a data transfer type indicating a different data transfer system according to a kind of transfer data and a transfer method, and the target transfer speed is determined according to the data transfer type.

16. The transfer speed control method according to claim 15, wherein the transfer information includes information indicating whether the currently connected first device corresponds to one of the plurality of transfer speeds.

17. The transfer speed control method according to claim 15, wherein the transfer information includes information indicating a kind of the first device and/or information indicating a maximum transfer speed of the first device.

18. The transfer speed control method according to claim 15, wherein in the step of switching the data transfer speed, information indicating whether the currently connected first device corresponds to one of the transfer speeds, information indicating a kind of the first device, and information indicating a maximum transfer speed of the first device is obtained.

19. The transfer speed control method according to claim 15, further comprising a step of obtaining the transfer information including a transfer execution state signal from the first device, and generating a band state signal, the transfer execution state signal indicating whether or not data is currently been transferred and the band state signal indicating a result of evaluating whether or not one of the transfer speeds is appropriate according to the transfer information, wherein in the step of switching the data transfer speed, the speed switching signal is transmitted to the second device via the second interface according to the current transfer speed input from the second device and the band state signal.

20. The transfer speed control method according to claim 19, wherein in the step of obtaining the transfer information and generating the band state signal, the transfer information that includes schedule information of the transfer data including a data size to be transferred, the transfer type indicating a different data transfer system according to a kind of the transfer data or a transfer method is obtained from the first device via the first interface, and the transfer execution state signal is generated according to the obtained information.

* * * * *

UNITED STATES PATENT AND TRADEMARK OFFICE
CERTIFICATE OF CORRECTION

| | | Page 1 of 1 |
|---|---|---|
| PATENT NO. | : 9,063,828 B2 | |
| APPLICATION NO. | : 13/536440 | |
| DATED | : June 23, 2015 | |
| INVENTOR(S) | : Numamoto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 335 days.

Signed and Sealed this
Seventeenth Day of November, 2015

Michelle K. Lee
*Director of the United States Patent and Trademark Office*